United States Patent
Whitfield

[15] 3,696,824
[45] Oct. 10, 1972

[54] PARTS WASHER
[72] Inventor: Homer G. Whitfield, Northville, Mich.
[73] Assignee: Condeco Automation, Inc.
[22] Filed: Feb. 13, 1969
[21] Appl. No.: 798,927

[52] U.S. Cl. .................. 134/62, 134/68, 134/112, 134/126
[51] Int. Cl. .............................................. B08b 3/02
[58] Field of Search........ 134/62, 67, 68, 72, 73, 112, 134/126

[56] References Cited

UNITED STATES PATENTS

| | | | |
|---|---|---|---|
| 1,625,930 | 4/1927 | Astrom | 134/73 X |
| 2,634,737 | 4/1953 | Rowe | 134/126 X |
| 3,049,134 | 8/1962 | Jacobsen et al. | 134/112 X |

FOREIGN PATENTS OR APPLICATIONS 1,145,761  3/1963  Germany.................134/72

Primary Examiner—Robert L. Bleutge
Attorney—Farley, Forster & Farley

[57] ABSTRACT

A washing drying device suitable for washing parts that have internally recessed portions such as pistons. The invention is suitable for use in a manufacturing line where parts are received from one processing operation, washed thoroughly by the present invention and delivered to a subsequent processing operation. The present invention utilizes a substantially vertical conveyor thus minimizing the necessary floor space and providing for the elevating of the parts between operations necessary in many manufacturing sequences. This is accomplished by providing the entrance near the lower portion of the washer and the exit near the upper portion of the washer.

5 Claims, 7 Drawing Figures

INVENTOR
HOMER G. WHITFIELD
BY Farley, Foster & Farley
ATTORNEYS

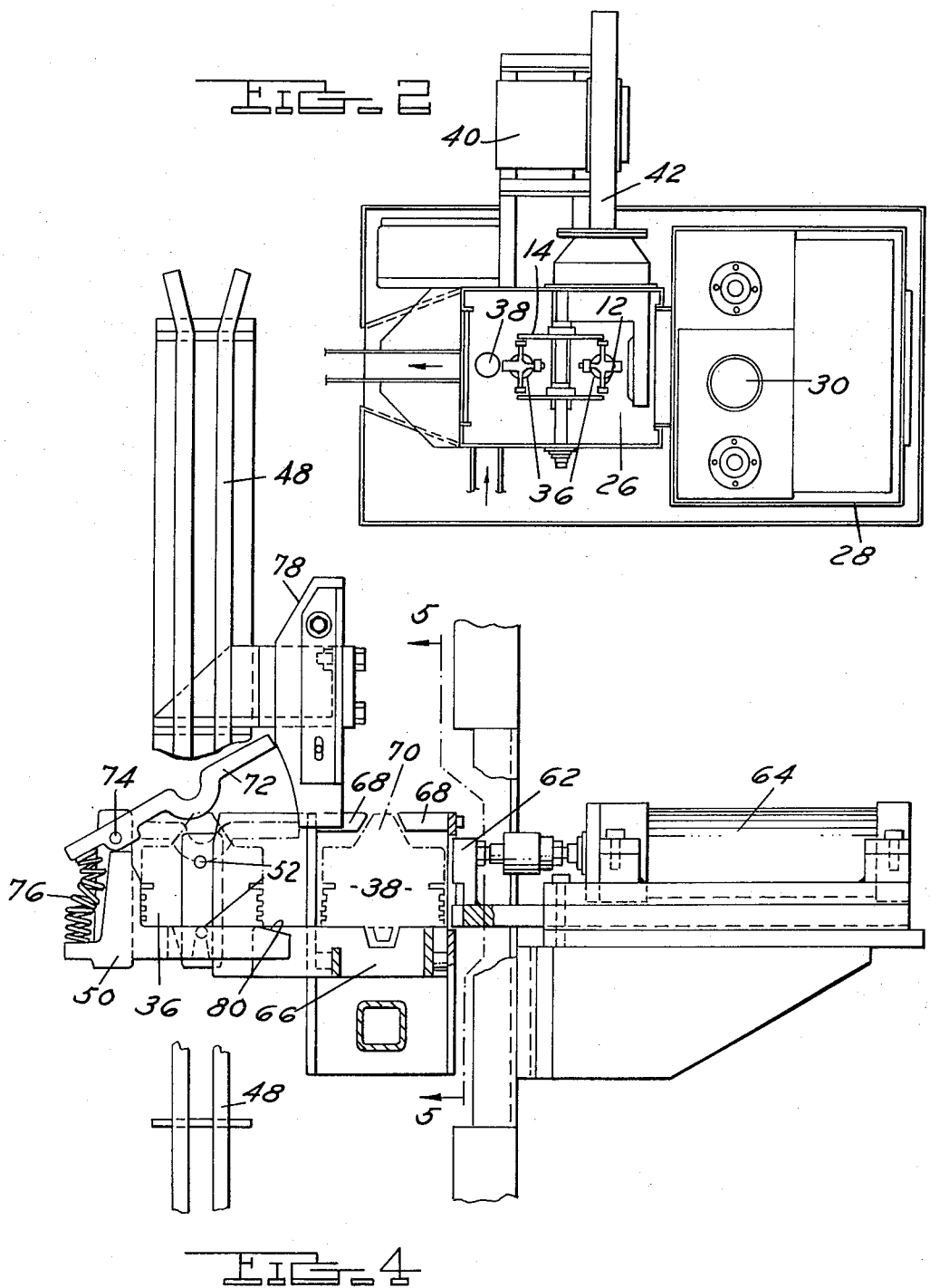

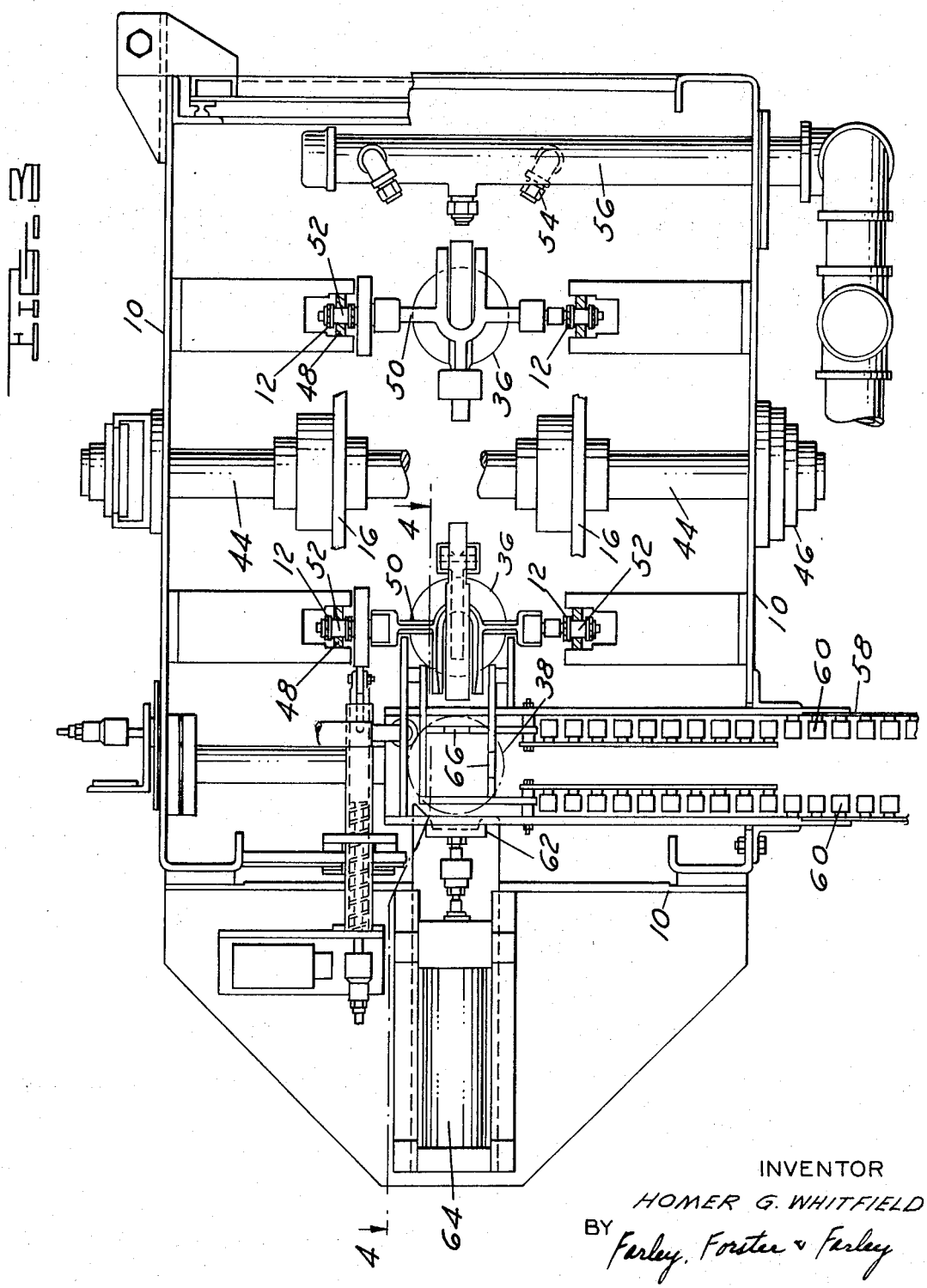

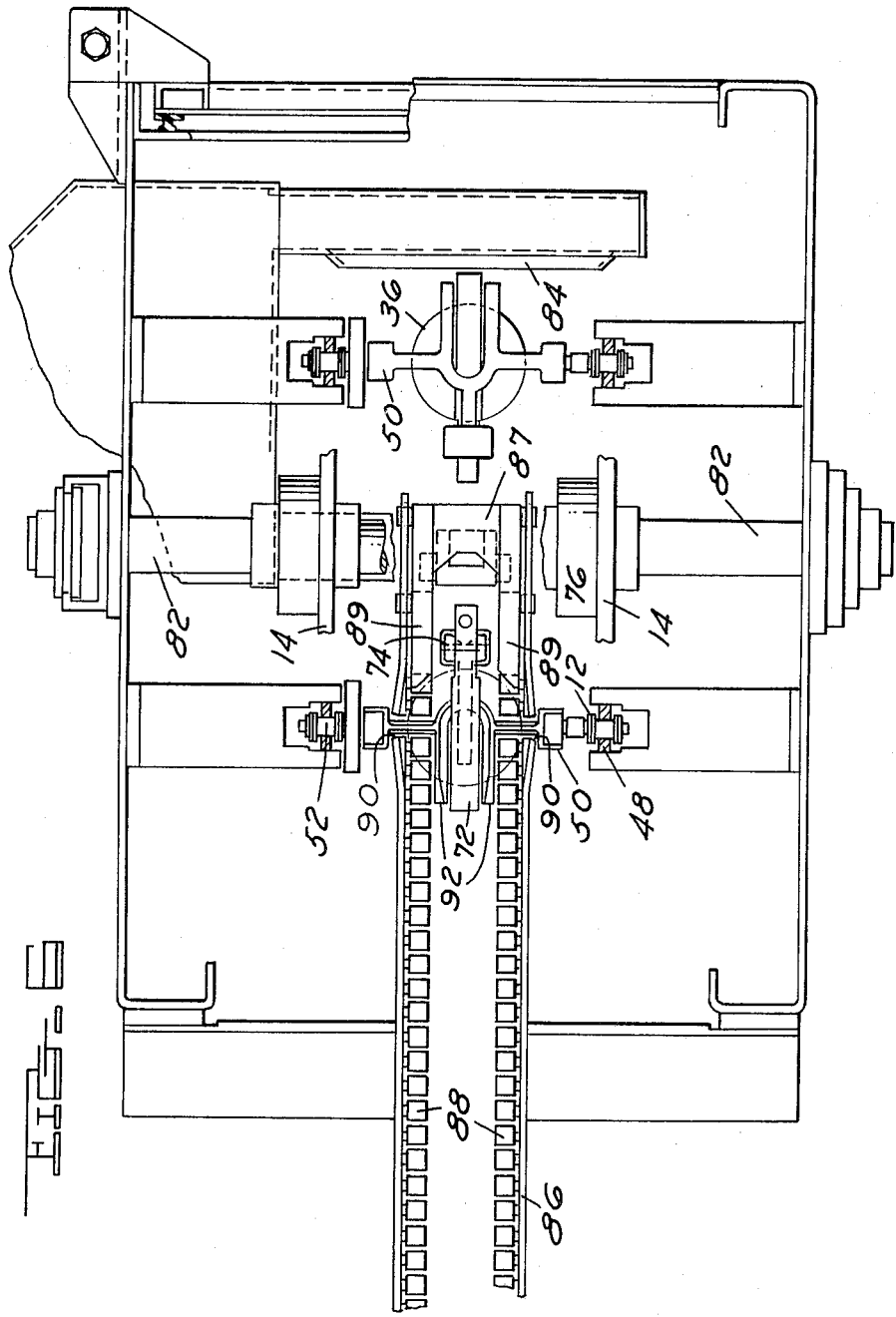

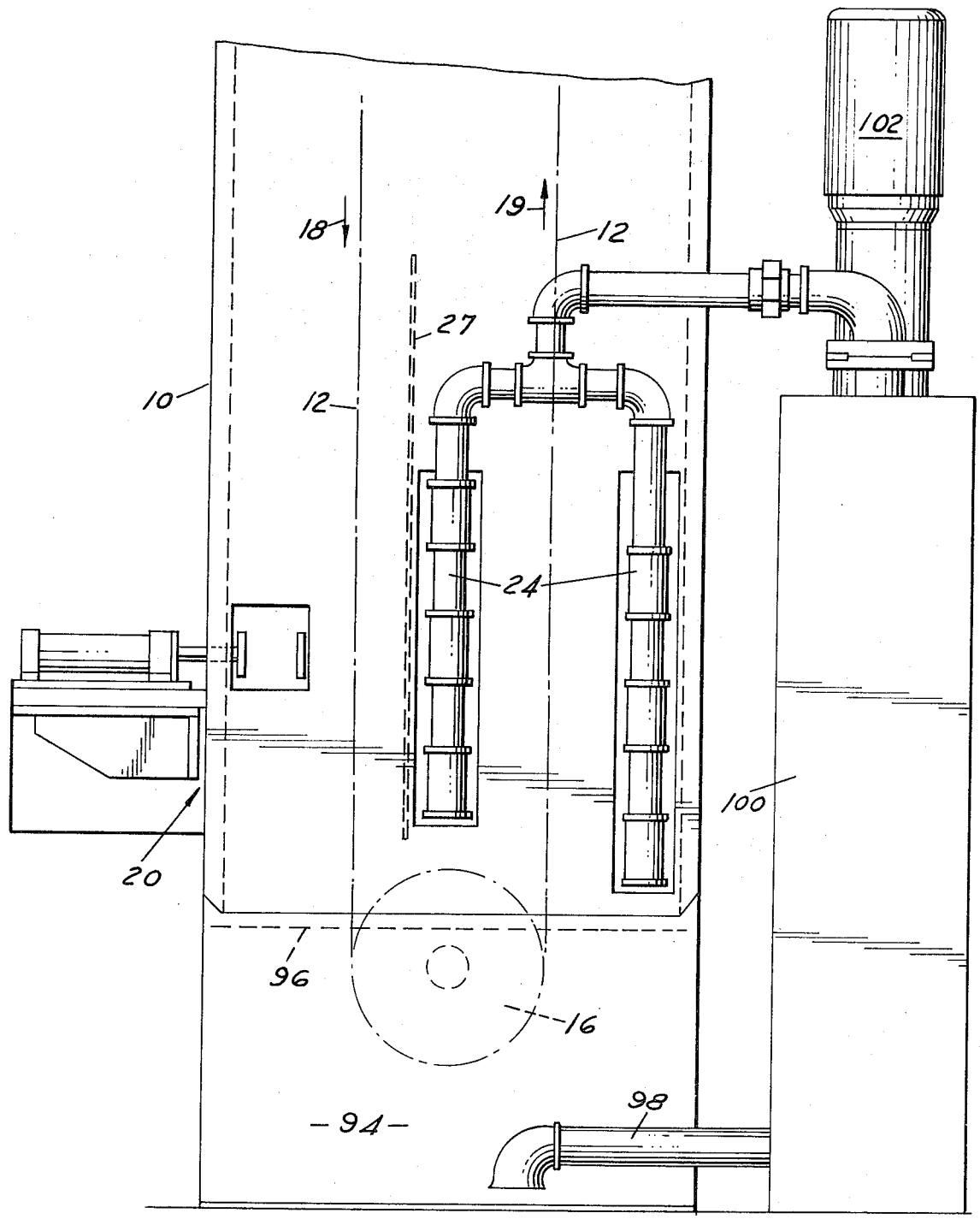

PARTS WASHER

BACKGROUND OF THE INVENTION

In the manufacture of parts such as pistons for automobile engines various manufacturing operations and the general environment of the manufacturing results in parts covered by grease, grime, chips and other foreign matter. In many cases this foreign matter needs to be removed between manufacturing operations. More especially in the case of pistons after the manufacturing is completed and the pistons are completely machined, they must be weighed and balanced for a final matching preparatory to installations in an automobile engine. The weighing and balancing is critical and grease, oil and chips stuck to the piston would severely impair the accuracy of these weighing and balancing operations; therefore, the pistons and other similar parts must be completely clean preparatory to weighing and balancing. This cleaning operation must be systematic and efficient in order to be utilized in a very high production operation. In general, the prior art has consisted of horizontal washing devices in which the pistons are passed dome downward through a spraying tank. A big disadvantage to this prior method was that with the dome down and skirt up the pistons tended to fill with the washing fluid and the washing action was completely inadequate. In addition, the spray was not directed from all directions toward the pistons so as to cover the entire outer surface as well as the interior surface. Similar problems occur with other parts that have depressions or internal recesses. Thus, parts with depressions or internal recesses can make the most advantageous use of the present invention although the present invention is also applicable to other parts.

SUMMARY OF THE INVENTION

Basically, the invention consists of a substantially vertical endless conveyor wherein parts such as pistons enter near the bottom of the conveyor and are rigidly affixed thereto. The conveyor direction is such that these parts then pass downward around the bottom of the conveyor thus turning upsidedown and pass upwards on the other side of the conveyor. The parts enter the washer such that as they pass upwards, the internal recess or depression of each part faces downward and the washing fluid at high pressure is directed from nozzles in all directions so as to completely clean the outside surface of the part as well as the internal recess of the part and allow the recess to drain as it is being cleaned, therefore obtaining the same washing action in a depression as is obtained on the outer surface of the part. The part then continues along the conveyor where a blast of air thoroughly dries the part. Finally, the part passes over the top of the conveyor, reverses orientation again, and is then released from the conveyor at a suitable exit above the entrance to the conveyor. As will become apparent below, the parts enter and leave the conveyor in the same vertical orientation. For example, in the case of a piston, it enters the conveyor with the dome down, is reversed such that the skirt is down and it can drain properly as it is being washed and dried and then is reversed again and leaves the washer with the dome downwards. As an option for the washing operation, the lower end of the conveyor may be submerged in a bottom collecting tank for the fluid. In this version, the part, such as a piston, will be submerged and soaked prior to being washed by the nozzles which are located above. An additional benefit useful in many cases is the fact that the washer serves as an elevating conveyor. In this manner the parts then are elevated and released such that they can move down by gravity to the next operation. By combining the functions of washing and elevating into a vertical tower a significant space saving is achieved over the prior separate units with a horizontal washer.

DESCRIPTION OF THE DRAWINGS

FIG. 2 is a plan view of the washer;

FIG. 3 is a top view of the loading and wash section of the washer taken along the lines 3—3 of FIG. 1;

FIG. 4 is a side elevation of the entrance loader to the washer taken along the line 4—4 of FIG. 3;

FIG. 6 is the unload and blow-off cross section taken along the lines 6—6 of FIG. 1; and FIG. 7 is a side elevation of an alternate version of the washer utilizing a soaking tank at the bottom and a self contained recirculating wash water supply.

DESCRIPTION OF THE PREFERRED EMBODIMENT

Figure 1:
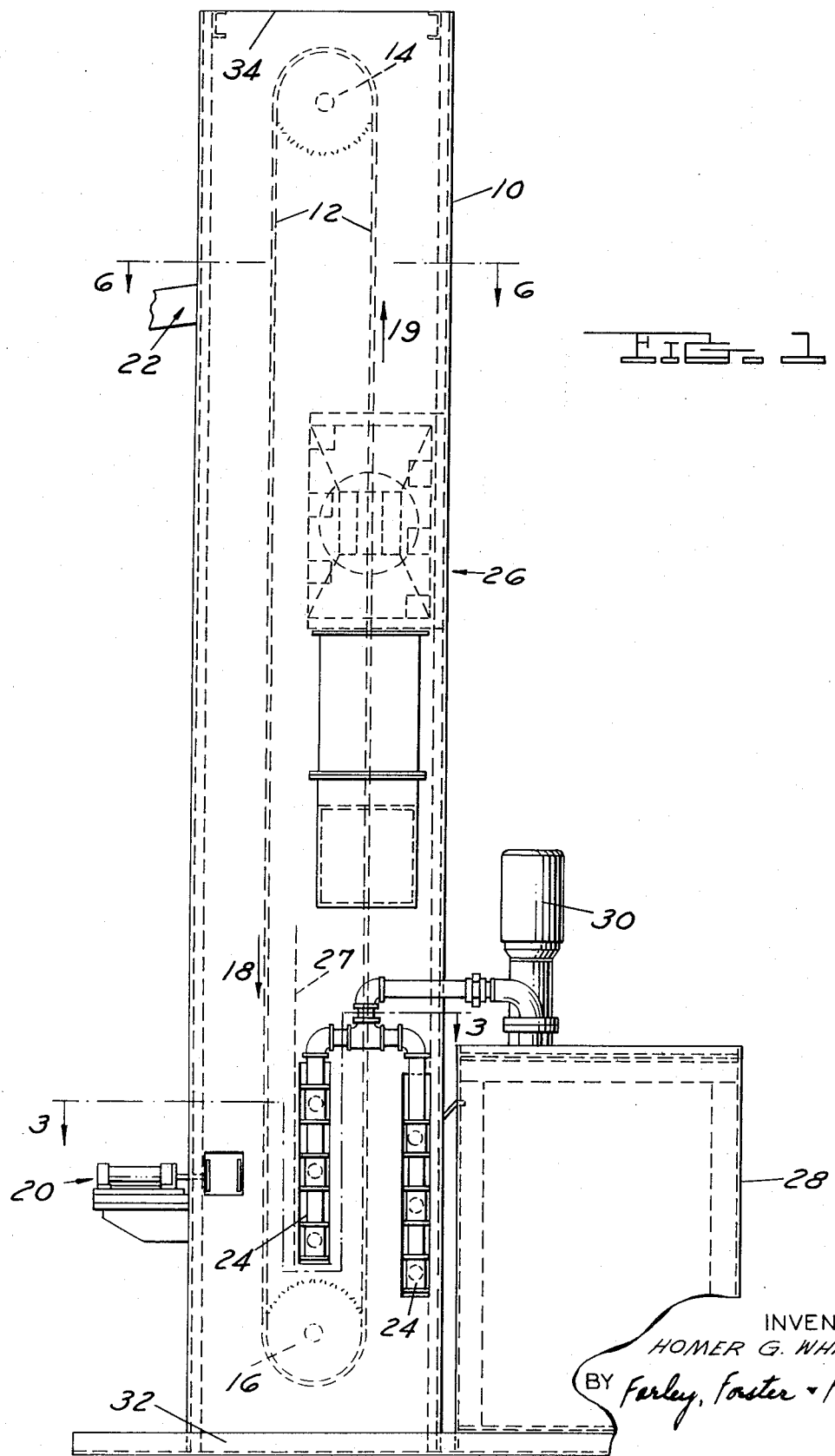
FIG. 1 is a side elevation of the washer.

The washer in FIG. 1 is enclosed in a vertical steel tower 10 and contains a vertical conveyor 12 rotating about upper and lower sprockets 14 and 16. The conveyor moves at a constant rate in directions shown by the arrows 18 and 19. The entrance and loading apparatus is located at 20 and the unloading apparatus is located at 22. The high pressure spray wash region is indicated by the piping shown at 24 and the blow-off drying region is located at 26. A baffle 27 is provided to prevent spray from reaching the entrance 20. A reservoir 28 is supplied by the in-plant wash and coolant supply and is pumped at high pressure to the wash region 24 by the pump 30. The used wash water is collected at the bottom 32 and drains into the plant sump. The exhaust air from the blow-off leaves the washer through the open top 34.

In FIG. 2, the plan view indicates the location of the parts 36 to be washed, pistons here, as they move on the conveyor 12. The conveyor 12, the parts 36 and the upper sprockets 14 are shown. The location of a piston just prior to loading is shown by the position 38 schematically. The air supply for the blow off 26 is provided by a blower 40 and associated ducting 42.

In FIG. 3, the lower conveyor sprockets 16 are mounted on a drive shaft 44. On the outside of the washer enclosure 10, the sprocket drive is powered by an electric motor conventional in the art through a torque limiting ratcheting type clutch 46 which can intermittently release the conveyor drive in case of jamming. This intermittent release action tends to cause any part that has jammed in the conveyor to vibrate loose, thus freeing the conveyor and automatically allowing continued operation. The conveyor chains 12 engage guides 48 on the vertical ascent and descent portions of the conveyor. The part carriers 50 are attached at each end 52 to the conveyor chains 12.

Nozzles 54 mounted on manifolds 56 direct the washing fluid at high pressure towards the piston 36. In this position as the piston is moving upward on the conveyor the skirt of the piston is downward and the dome is upward. Therefore, wash water cannot collect in the piston. On the descending portion of the conveyor shown also in FIG. 3 is the entrance apparatus for loading the pistons 36 onto the conveyor. Pistons are received from a spiral gravity conveyor 58 having free rollers 60. A shuttle 62, actuated by an air cylinder 64 and located at the end of the entrance conveyor 58, shuttles each piston into a part carrier 50 passing by the entrance region. With this arrangement subsequent pistons can accumulate along the free conveyor 58 without adding significant stacking pressure to the loading apparatus of the washer, since the shuttle operates perpendicular to the stored pistons. The air cylinder shuttle is actuated in a conventional manner by the passage of each part carrier 50 as it approaches the entrance region. The pistons enter along the conveyor 58 dome downward and skirt up. At the entrance region they slide along the tracks 66 prior to loading into a part carrier 50.

In FIG. 4, a piston 38 is shown just preparatory to loading. Guides 68 above the piston 38 orient the piston properly by orienting the skirt 70 thereof. The part carrier 50 is shown in both the open and closed position. The part carrier 50 has a clamping member 72 pivoted about the point 74 and held closed by a spring 76. As the part carrier 50 descends towards the entrance region, the cam surface 78 opens the clamping member 72. A piston 38 with the skirt 70 properly oriented is pushed by the shuttle 62 into the open part carrier 50. In the event that the piston 38 meets the part carrier 50 prematurely, the bevelled portion 80 of the part carrier 50 will allow the piston 38 to slide up into the part carrier. In the event that the piston 38 jams as it enters the part carrier 50, the ratcheting type clutch drive of the conveyor will cause the conveyor to oscillate at this point until the piston is freed. Experience has shown that pistons will enter the part carriers, smoothly at a conveyor chain speed of about 25 ft. per min. and there is no necessity to provide any indexing in this kind of loading operation. The part carrier 50 is connected to the chains 12 on each side by the pins 52, one above the other. Since the conveyor chains are engaged by the guides 48, the part carrier 50 is kept in proper vertical alignment as it descends past the entrance region.

Figure 5:
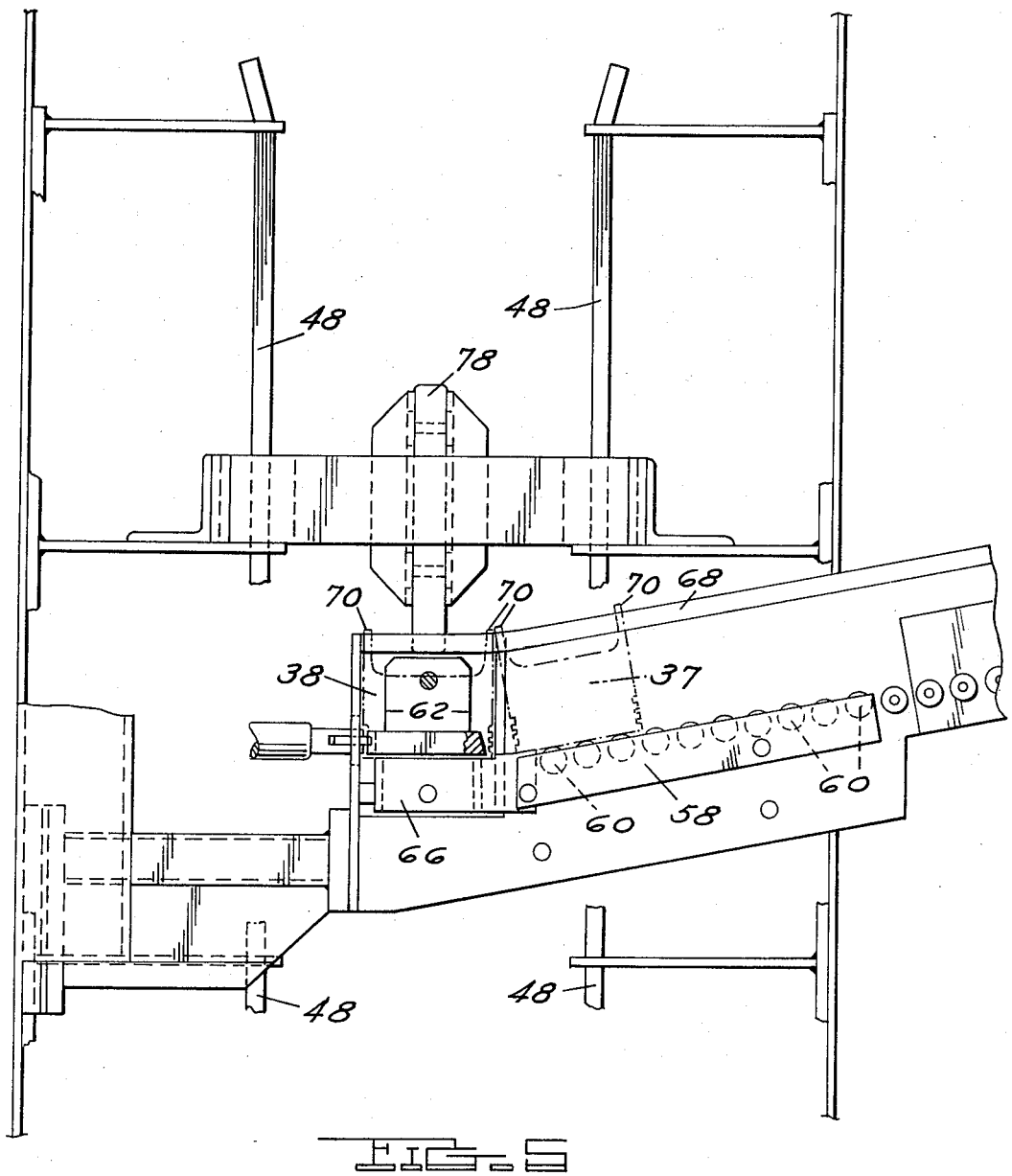
FIG. 5 is a front elevation of the loader for the washer taken along the line 5—5 of FIG. 4.

In FIG. 5, the entrance region again is shown from the front with the gravity entrance conveyor 58 shown with one piston 37 resting on rollers 60 against a second piston 38 already positioned preparatory to loading. As can be seen from FIGS. 4 and 5, the piston skirts 70 are properly oriented by the guides 68 such that a piston will clear the cam 78 as the piston is loaded into the part carrier 50 and the clamping member 72 of the part carrier 50 will properly clamp the piston into the part carrier.

In FIG. 6 are shown the upper sprockets 14 on the upper conveyor shaft 82. Again are shown the guides 48, chains 12 and the part carriers 50. Air is blown from the duct exit 84 against the piston 36 as it passes by on the ascending side of the conveyor. As before, on the ascending side of the conveyor, the piston is held with the dome up and the skirt down. Since the exit for the air blown in to dry the piston is at the top of the washer, the piston continues to be dried by a strong convection current of air as it passes over the top of the conveyor sprockets 14 and starts the descent on the other side of the washer. The piston therefore is now approaching the exit with the dome down and the skirt up. Just prior to reaching the exit shown in this drawing, the clamping member 72 is opened by a cam surface similar to that at the entrance region. The exit conveyor 86 is also a gravity type conveyor with rollers 88. As shown here, this exit conveyor 86 passes through the vertical conveyor in the washer and intersects the path of movement of a part thereon. However, the exit conveyor 86 is provided with slots 90 which allow the part carrier 50 to pass through as it descends. The lower portion 92 of the part carrier is narrow enough to clear the rollers 88 of the exit conveyor 86 and thus the piston itself 36 is placed on the exit conveyor rollers 88. A shuttle 87 with extended arms 89 nudges the piston away from the part carrier and the exit conveyor 86 is slanted downwards to allow the piston to roll from the washer. The shuttle 87 is actuated by the conveyor 12 in a conventional manner. The washer performs the secondary function of an elevating conveyor in a gravity feed system and thus obviates the need for a separate elevating conveyor between operations on the piston.

In FIG. 7, an alternate version of the washer with a recirculating wash water system is shown. At the bottom of the washer is a reservoir 94 with the wash fluid level kept about the level indicated by 96. The bottom end of the conveyor 12 and lower sprockets 16 are immersed in the reservoir 94. Pistons entering the washer at 20 move downward in a direction 18 on the conveyor 12 and are immersed in the reservoir 94 prior to moving upward in the direction 19 and subjection to the high pressure sprays from the manifold 24. The wash water from the high pressure sprays drains downward into the reservoir 94. The return pipe 98 leads to a filter chamber 100 which also contains the pump 102. The length of time for the soak can be adjusted by changing the speed of the conveyor 12 or by providing a deeper reservoir 94, with the lower end of the conveyor and sprockets 16 more deeply immersed in the reservoir 94. Since a piston at 20 entered with the skirt up and the dome down and leaves the soaking reservoir 94 with the dome up and skirt down, the water inside the piston drains as it leaves the soak.

I claim:

1. In a parts washer having a conveyor consisting of at least one endless chain moving at a substantially constant speed and trained about a pair of vertically spaced sprockets to provide opposite upward and downward directions of chain movement spray washing means and drying means, and part carriers attached to the chain to convey parts through said spray washing means and said drying means, the improvement wherein:

the part carriers each include movable clamping means adapted to clamp a part therein, and means mounting the part carriers on the conveyor in fixed relation therewith whereby the orientation of parts clamped in the part carriers is reversed along the opposite directions of chain movement; and, loading and unloading apparatus arranged in vertically spaced relation along said downward direction of chain movement with the unloading apparatus located above the loading apparatus whereby parts are elevated by passing through the parts washer, the loading and unloading apparatus each including shuttle means movable transversely to said downward direction of chain movement for feeding parts into and removing parts from part carriers respectively passing said loading apparatus and said unloading apparatus.

2. A parts washer according to claim 1 further comprising cam means located adjacent the conveyor and adapted to open said clamping means as the part carriers pass the shuttle means of said loading apparatus and said unloading apparatus.

3. A parts washer according to claim 1 wherein the unloading apparatus includes an exit conveyor intersecting the path of movement of a part on a part carrier.

4. A parts washer according to claim 1 wherein the conveyor includes a ratcheting type clutch to provide a rapidly oscillating change in speed whenever a predetermined torque overload occurs.

5. A parts washer according to claim 1 wherein said loading apparatus and said unloading apparatus each include a gravity roller conveyor, the gravity roller conveyor of the loading apparatus feeding parts to the shuttle means thereof, and the gravity roller conveyor of the unloading apparatus intersecting the path of movement of a part on the conveyor.

* * * * *